2,870,060

STABLE ENCAPSULATED SOLUTION OF A SALT OF A DIALKYL SULFOSUCCINATE

Hugh D. Bryan, Evansville, Ind., assignor to Mead Johnson & Company, Evansville, Ind., a corporation of Indiana No Drawing. Application February 7, 1956
Serial No. 563,837

8 Claims. (Cl. 167—56)

This invention pertains to an encapsulated preparation adapted to relieve constipation when occasioned by hardening of fecal masses.

It is known that nontoxic salts of dialkyl sulfosuccinates when introduced into the large intestine prevent constipation if the latter is due to hardening of fecal masses. The dialkyl sulfosuccinates function as penetrants which enable other liquids to enter and soften hardened fecal masses and thus facilitate elimination of the same. The dialkyl sulfosuccinate to be ingested usually takes the form of a one percent aqueous solution in a taste camouflaging fluid, such as milk or orange juice. The diluting liquid is necessary since the sulfosuccinate is bitter in taste and decidedly unpalatable.

Because of the disagreeable taste of the dialkyl sulfosuccinates, usually administered as dioctyl sodium sulfosuccinate, the expediency of orally administering them in tablet form would normally appear to be the logical solution to the taste problem.

Dioctyl sodium sulfosuccinate and the other nontoxic dialkyl sulfosuccinates are normally soft waxy materials and possess high surface activity when dissolved, being powerful wetting agents and surface tension depressants. Consequently, all attempts to tablet dioctyl sodium sulfosuccinate have been unsuccessful since the granulations were all so soft that they could not be run on a tablet machine. The tableting attempts were further complicated by the somewhat hygroscopic nature of the material which added further softness to the already soft granulations.

Accordingly, it is an object of this invention to provide a therapeutic composition containing a nontoxic dialkyl sulfosuccinate which is in the form of a capsule. However, attempts at encapsulation of such compounds have not been free of difficulty. Initial attempts were made to encapsulate a solution of dioctyl sodium sulfosuccinate in cocoanut oil in a soft gelatin capsule. Cocoanut oil was chosen as the solvent because of its high dissolving ability for the sulfosuccinate. When such solutions were encapsulated in glycerin-plasticized or sorbitol-plasticized gelatin shells, the resulting capsules were satisfactory for therapeutic cases but had the disadvantage that they were relatively unstable at temperatures over 35° C. At this temperature the oily solution of the surface active dialkyl sulfosuccinate and oil penetrated the shells of the capsules and serious leakage of their contents resulted.

Accordingly, it is a further object of this invention to provide encapsulated nontoxic salts of dialkyl sulfosuccinates which are stable at ordinary storage temperatures.

It is a further object of this invention to provide encapsulated nontoxic salts of dialkyl sulfosuccinates for oral administration which may not be tasted during ingestion and which readily dissolve in the stomach or intestinal tract and function soon after ingestion.

It is a still further object of this invention to provide a dialkyl sulfosuccinate preparation which may be encapsulated and which enables effective daily dosages to be ingested orally in a minimum number of capsules.

The above and other objects will become more apparent upon proceeding with the acompanying description and appended claims.

It has been found that, by utilizing a solution of dioctyl sodium sulfosuccinate in a polyethylene glycol, a satisfactory dosage of the sulfosuccinate may be encapsulated in soft gelatin capsules. These capsules have shown satisfactory stability at temperatures in excess of ordinary storage temperatures for a considerable period of time. This combination produces a surprising result, since both polyethylene glycol and the dialkyl sulfosuccinates are surface active agents and neither may be encapsulated alone without leakage. The combination of the two gives a surprising resulting product.

In accordance with one embodiment of this invention, a soft waxy nontoxic salt of a dialkyl sulfosuccinate is dissolved in a polyethylene glycol preferably having an average molecular weight of between about 200 and 600. The mixture is then encapsulated in a gelatin shell. Although each of the solution ingredients is highly surface active, the combination of the two when encapsulated in a soft gelatin shell is surprisingly stable. The resulting shell reveals no evidence of leakage at elevated temperatures in excess of ordinary storage temperatures, for prolonged periods of time. The gelatin capsule containing the dialkyl sulfosuccinate and polyethylene glycol solutions may be readily ingested without any disagreeable taste of the bitter dialkyl sulfosuccinate being detected. The gelatin capsule, after ingestion, is readily dissolved in the stomach, and the nontoxic dialkyl sulfosuccinate immediately mixes with the stomach contents and becomes available to function after passing into the intestinal tract.

The preferred dialkyl sulfosuccinate to be utilized in the present invention is dioctyl sodium sulfosuccinate [bis(2-ethylhexyl) sodium sulfosuccinate]. It has been found that a solution of the latter sodium sulfosuccinate in approximately 78 percent by weight of polyethylene glycol having an average molecular weight of about 400 may be encapsulated in soft sorbitol-plasticized, low-water gelatin capsules. Despite the fact that both dioctyl sodium sulfosuccinate and polyethylene glycol are surface active agents, the resulting capsules containing this solution displayed satisfactory stability at temperatures up to 45° C. for a prolonged period sufficient to permit them readily to be accepted as having suitable thermostability for shipping and handling such a product.

Using a 4-minim capsule, dosages as high as 60 milligrams of dioctyl sodium sulfosuccinate may be orally administered at one time. Since the suggested quantity or dosage per day of dioctyl sodium sulfosuccinate for adults is between about 60 to 120 milligrams per day, it is apparent that the daily dosage of this therapeutic may be readily taken in a minimum of one or two capsules if so desired.

Although polyethylene glycol having an average molecular weight of 400 is preferred as the solvent for the dioctyl sodium sulfosuccinate, any polyethylene glycol having an average molecular weight of between 200 and 600 may be utilized. Polyethylene glycols having an average molecular weight appreciably below approximately 200 are not ordinarily desired because of the toxic properties of these low molecular weight substances, and those glycols having an average molecular weight above 600 are usually too viscous to work in an encapsulating machine. Consequently, those polyethylene golycols having an average molecular weight of about 400 are preferred.

It has also been found that, although a solution containing approximately 22 percent dioctyl sodium sulfosuccinate and 78 percent of a polyethylene glycol having an average weight of approximately 400 is the preferred composition and will function efficiently, other dioctyl sodium sulfosuccinate concentrations up to about 40 percent by weight will work to advantage. The minimum concentration of sulfosuccinate is, of course, determined by the size of the capsule and the dosage desired. It may in some instances be desirable to administer small concentrations of the solution intermittently throughout the day. The dosages for children are also less than those for adults and, consequently, a lesser concentration of the dialkyl sulfosuccinate in the polyethylene glycol may be desirable. Usually the concentration of the dialkyl sulfosuccinate is in excess of about 5 percent by weight.

It has been found that capsules formed from sorbitol-plasticized low water gelatin display surprising stability when a dioctyl sodium sulfosuccinate-polyethylene glycol mixture is encapsulated. As above mentioned, practical attempts to encapsulate solutions of the sulfosuccinate in vegetable oils, such as cocoanut oil, met with failure because of the high surface activity of the sulfosuccinate. Using such solutions, the water in the shell of the soft gelatin capsules drew the contents into the shell, resulting in leakage at ordinary storage temperatures after short periods of time. When, however, dioctyl sodium sulfosuccinate was mixed with a polyethylene glycol, even though each ingredient of the encapsulated solution was surface active, no leakage resulted. This surprising stability persisted for extended periods of time at storage temperatures in excess of the usual room temperature.

A typical sorbitol-plasticized gelatin composition utilized in making capsules adapted to hold a dioctyl sodium sulfosuccinate-polyethylene glycol mixture is as follows:

| | Percent by weight |
|---|---|
| Gelatin [1] | 44 |
| Sorbitol [1] | 21.7 |
| Water | 34.3 |

[1] Moisture free.

This composition is given for purposes of illustration, and it is obvious that other shell formulations composed of the above ingredients will work to advantage.

It is thus seen that a novel encapsulated therapeutic has been provided which functions in an efficient and rapid manner. Dioctyl sodium sulfosuccinate is bitter in taste and decidedly unpalatable. By encapsulating a solution of the sulfosuccinate with polyethylene glycol in a sorbitol-plasticized, low-water gelatin shell, a stable capsule results which may readily be ingested without tasting the bitter component. The soft gelatin capsule readily dissolves in the stomach releasing the ingredients for mixing with the stomach contents. The dioctyl sodium sulfosuccinate upon entering the large intestine penetrates any hardened fecal matter present, facilitating entrance by other fluids and thus functions to soften the fecal matter, thereby facilitating subsequent elimination of the same.

Although dioctyl sodium sulfosuccinate is the preferred form of the dialkyl sulfosuccinate to be utilized in the above-described therapeutic, it should be understood that any nontoxic salt of a dialkyl sulfosuccinate in which each of the alkyl groups has from between five to ten carbon atoms is suitable for purposes of this invention. Examples of nontoxic salts other than sodium which will work to advantage are potassium and ammonia.

The theory explaining the synergistic effect resulting from the mixture of the above-described surface active ingredients is not known. It will be noted that dioctyl sodium sulfosuccinate is an anionic surface-active agent, whereas the polyethylene glycol is a nonionic surface-active agent. It is theorized that perhaps this dissimilarity is the means preventing passage of either of the surface active agents through the soft gelatin shell.

While this invention has been described with particular reference to gelatin capsules, it will be readily apparent that it is useful in connection with other well-known encapsulating substances which will dissolve in the digestive tract upon ingestion.

In view of the many modifications of the encapsulated therapeutic which may be prepared following the teaching above disclosed, it is intended that this invention be limited only by the scope of the appended claims.

I claim:

1. A capsule comprising a shell of soft gelatin containing a liquid which consists essentially of a liquid polyethylene glycol having an average molecular weight of from about 200 to 600 having dissolved therein between about 5 and 40 percent by weight of an alkali metal including ammonium salt of a dialkyl sulfosuccinate.

2. The capsule recited in claim 1 wherein said gelatin is plasticized with a substance selected from the group consisting of sorbitol and glycerin.

3. The capsule recited in claim 2 wherein said substance is sorbitol.

4. The capsule recited in claim 1, wherein said salt is dioctyl sodium sulfosuccinate.

5. The capsule recited in claim 4 wherein said percent is about 22 percent.

6. An encapsulated liquid solution consisting essentially of a polyethylene glycol having a molecular weight of from about 200 to 600 and having dissolved therein between about 5 and 40 percent by weight of an alkali metal including ammonium salt of a dialkyl sulfosuccinate.

7. The encapsulated solution recited in claim 6 wherein said salt is dioctyl sodium sulfosuccinate.

8. The encapsulated solution recited in claim 6 wherein said percent is about 22 percent.

References Cited in the file of this patent

UNITED STATES PATENTS

| 2,580,683 | Kreuger | Jan. 1, 1952 |
| 2,791,530 | Dallavis et al. | May 7, 1957 |

OTHER REFERENCES

Drug and Cos. Ind., vol. 69, No. 3, September 1951, pp. 317 and 378.

J. Amer. Med. Assoc., vol. 158, No. 4, May 28, 1955, pp. 261–263.

Drug and Cos. Ind., vol. 69, No. 3, September 1951, p. 399.

U. S. Dispensatory, 25th ed., J. B. Lippencott Co., Inc., Phila., Pa., 1955, pp. 1082 and 1302.